July 11, 1944.                L. A. M. CORSET                2,353,148
                  REMOTE READING ELECTRIC INDICATOR GAUGE
                       Filed Feb. 27, 1940        6 Sheets-Sheet 2
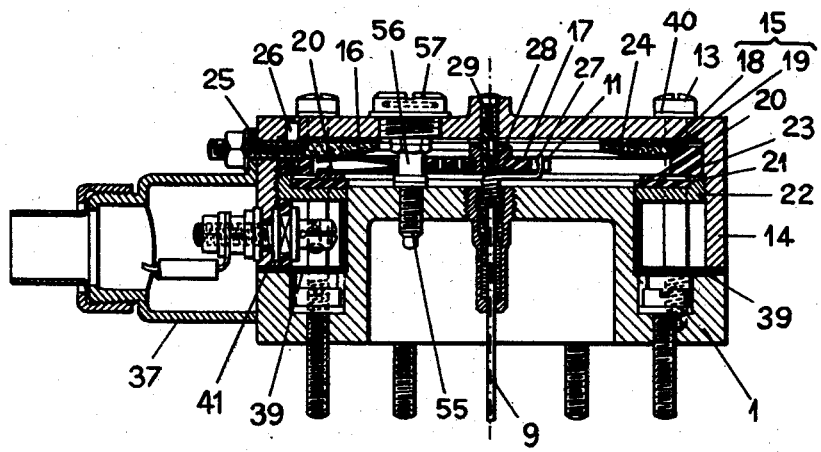
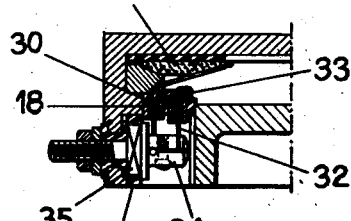
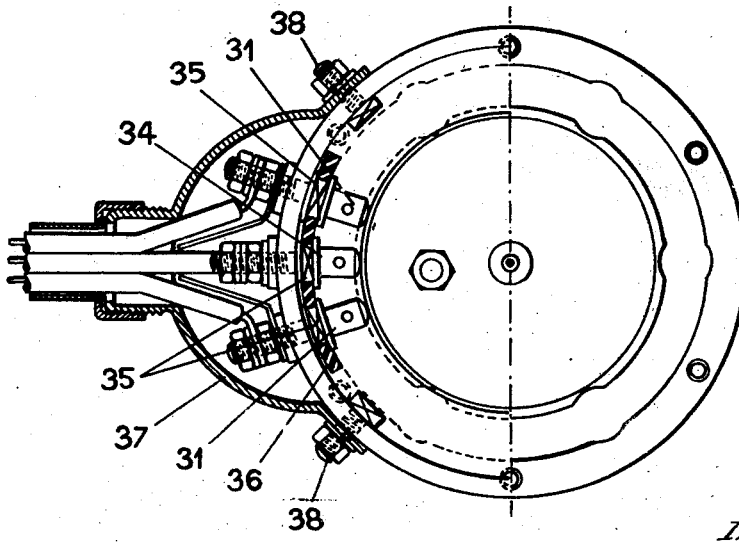
INVENTOR
L. A. M. Corset
By
E. F. Wendroth
ATTORNEY July 11, 1944.  L. A. M. CORSET  2,353,148
REMOTE READING ELECTRIC INDICATOR GAUGE
Filed Feb. 27, 1940  6 Sheets-Sheet 4
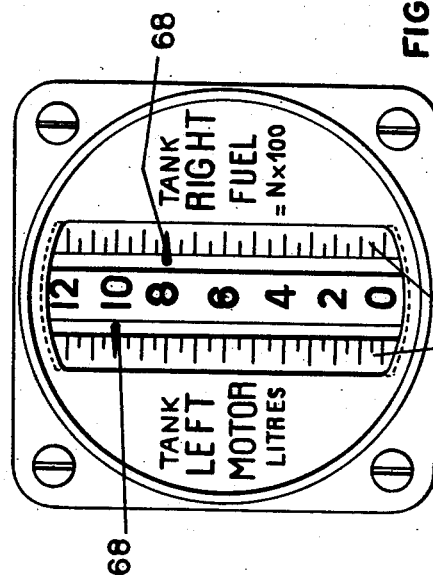
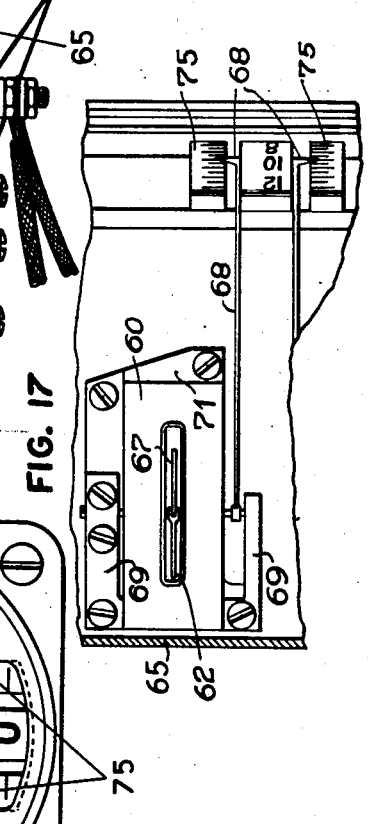
INVENTOR
L.A.M.Corset
By
*(signature)*
ATTORNEY July 11, 1944.  L. A. M. CORSET  2,353,148
REMOTE READING ELECTRIC INDICATOR GAUGE
Filed Feb. 27, 1940  6 Sheets-Sheet 5
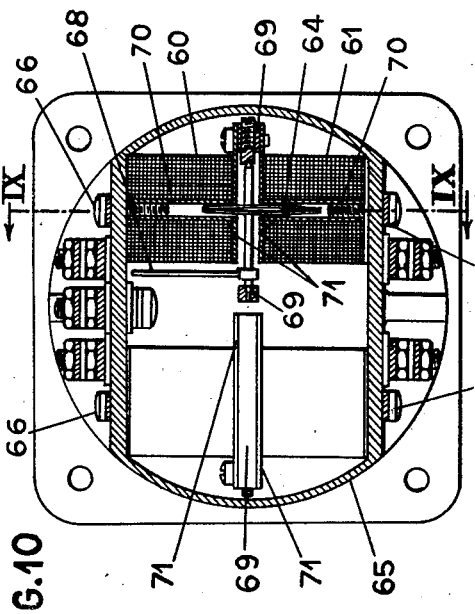
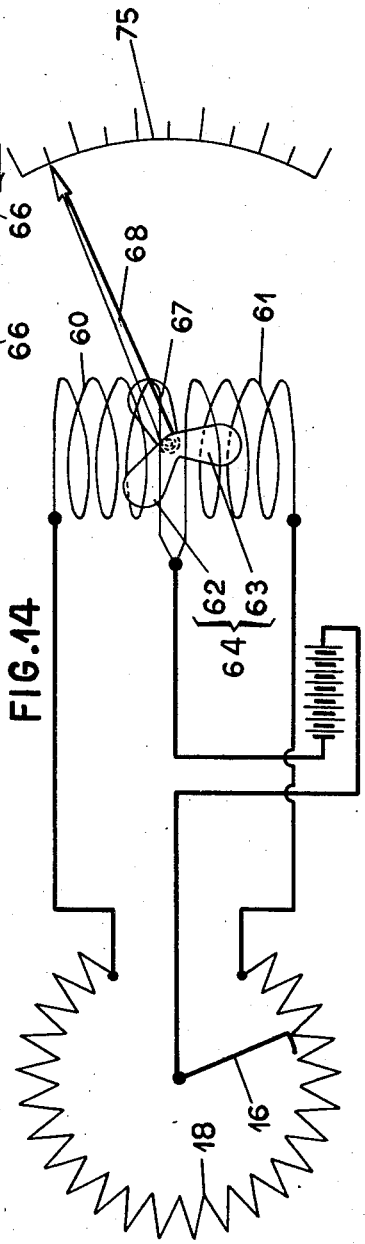
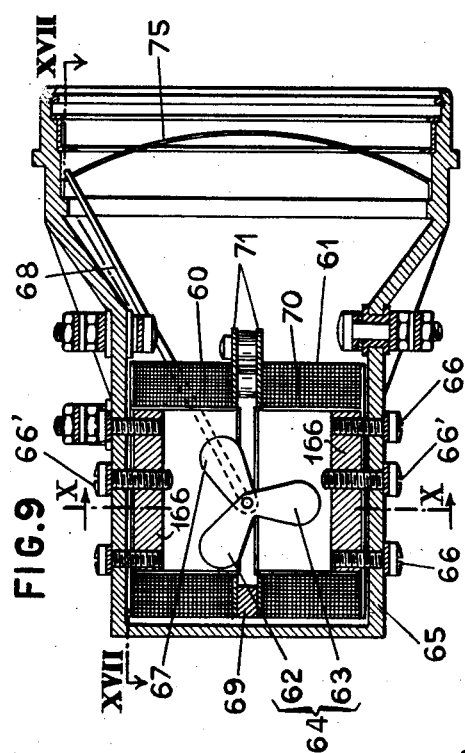
INVENTOR
L. A. M. Corset
By
E. F. Wendroth
ATTORNEY July 11, 1944. L. A. M. CORSET 2,353,148
REMOTE READING ELECTRIC INDICATOR GAUGE
Filed Feb. 27, 1940 6 Sheets-Sheet 6

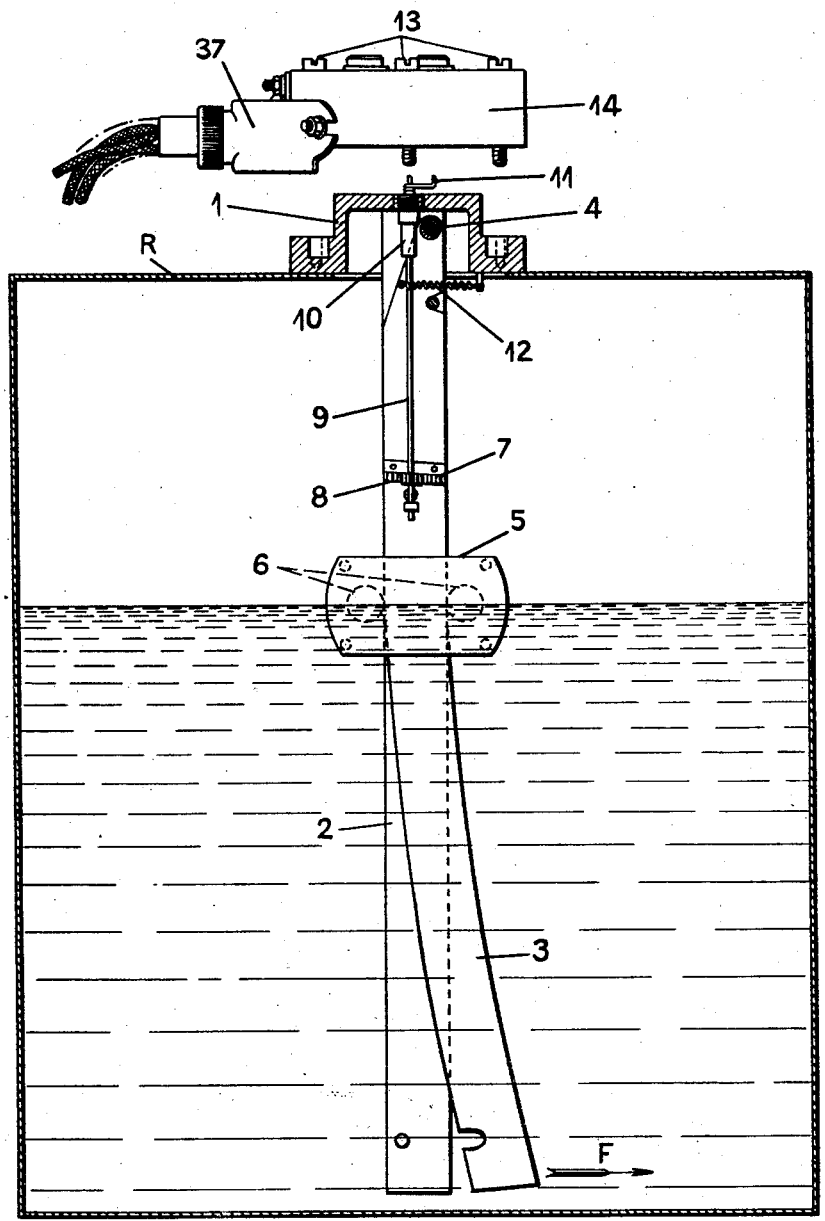

INVENTOR
L.A.M. Corset
By
E.F. Wenderoth
ATTORNEY

Patented July 11, 1944

2,353,148

UNITED STATES PATENT OFFICE 2,353,148

REMOTE READING ELECTRIC INDICATOR GAUGE

Lucien Alfred Maurice Corset, Paris, France; vested in the Alien Property Custodian Application February 27, 1940, Serial No. 321,103
In France March 24, 1939

6 Claims. (Cl. 171—95)

The present invention has for its object a remote reading electric indicator gauge, based on the well known principle of the potentiometer, this apparatus possessing, inter alia, the following features:

The transmitter of the indicator gauge is formed by the combination, on the one hand of a mechanical control device provided with a lever of appropriate shape, which is pivoted on the upper end of two vertical guides fixed to a base which is mounted on the tank to be gauged, along which guides there moves a float whose vertical position controls the angular position of the aforesaid pivoted lever, the angular movement of which varies, by means of a rack and pinion system, the angular position of a transmitting member, with, on the other hand a potentiometer (or like member), the circular winding and the rotary slider of which are arranged in a removable case provided with outward terminals and fixed on the base of the aforesaid mechanical control device.

The receiver (which may be double) is formed by the combination, on the one hand of two coils supplied by means of a source of direct current and through the potentiometer of the transmitter, said coils being placed in the extension of each other (and not superposed at right angles to each other, as is the case in the known indicators), with, on the other hand a movable system formed by an armature having two blades made of magnetic metal and dynamically balanced by means of an auxiliary armature made of non-magnetic metal arranged along the bisector of the complementary angle of the angle (120°) formed between the blades in question.

Other details and features will become apparent in the course of the ensuing description made in conjunction with the accompanying drawings in which there has been shown diagrammatically and by way of a non-limitative example, one embodiment of the remote reading electric indicator gauge which is the subject of the present invention.

Fig. 1 shows (partly in section) a general view of the transmitter;

Fig. 2 is a vertical section of the electric part of the transmitter;

Fig. 3 shows in section a part of Fig. 2 and more particularly the electric connections of the potentiometer;

Fig. 4 is a plan view of the transmitter with the outside connections;

Fig. 7 is a front view of a double receiver;

Fig. 8 is a side view thereof;

Fig. 9 is a section along the line IX—IX of Fig. 10;

Fig. 10 is a view in partial section along the line X—X of Fig. 9;

Fig. 14 shows the diagram of the connections of the whole apparatus;

Fig. 17 is a horizontal section along the line XVII—XVII of Fig. 9.

Figure 5:
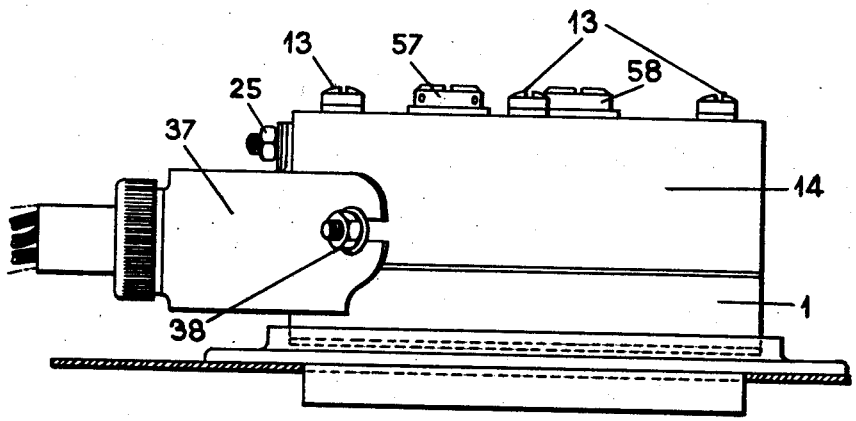
Fig. 5 is an elevational view of the case for the electric part and of the base of the transmitter.
Figure 6:
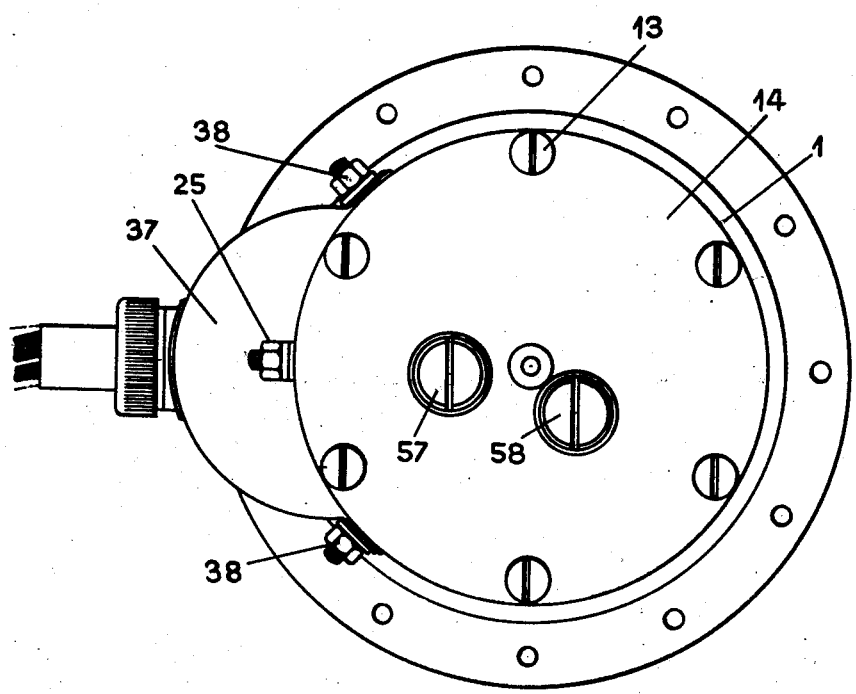
Fig. 6 is a plan view of Fig. 5.

As shown in the accompanying drawings, the transmitter comprises a circular base 1 fixed to the upper part of the tank R to be gauged, which base supports the mechanical part of the apparatus, viz., two vertical guides 2, between which can pivot a bent vertical lever 3 pivoted at 4 on the upper part of the guides 2 along which there moves, in the vertical direction, a double float 5 provided with guide rollers 6. The lever 3 carries a rack 7 meshing with a pinion 8 fast on a vertical spindle 9 which is supported by one of the two vertical guides 2 and passes through a stuffing box 10 mounted in the base 1, which stuffing box prevents any projection of liquid into the upper part of the transmitter in case of jerks imparted to the tank. The upper end of the spindle 9 carries a small actuating crank 11.

The lever 3 is constantly subjected, in the direction of the arrow F, to the action of a retracting spring 12, an arrangement whereby said lever always tends to bear on the same side against one of the rollers 6, so that the effect of the play between said rollers is eliminated.

The curve of the lever 3 may be made to take into account the shape of the tank, in order to correct the discontinuity of the space between the graduation in the receiver which will be described hereinafter, and to obtain more even graduations in said receiver in the parts of the scale which correspond to the low points of the tank, for which greater accuracy is required.

The fulcrum 4 of the lever 3 is very high, which enables the float to rise up to the top of the tank, the remaining length of the lever arm 3 being thus sufficient to enable satisfactory accuracy to be obtained, even at the high points of the travel of the float. The float 5, which is of flat shape, has great power for the control and, owing to the aforesaid flat shape, it can be readily passed, by holding it vertically, through the orifice of the tank, for assembling the whole arrangement.

The spindle 9 may actuate either a pointer which moves over a dial, or the slider of the potentiometer which will be described hereinafter, it being possible moreover to combine the two means with each other. On the base 1 is fixed, by means of screws 13, a case 14 containing the electrical members of the transmitter.

The said electrical members comprise a circular potentiometer 15, on the winding of which there moves a slider 16 secured to a rotary insulating plate 17 which is driven by the spindle 9 through the crank 11.

The slider 16, which is of the double brush type, moves, on the one hand on the winding 18 of the potentiometer 15, which winding is formed by an enamelled resistance wire 18 which is suitably bared (by filing) to permit of a good contact with the slider and is wound on a flat ring 19 made of insulating material, and on the other hand on a metal ring 20 which does not possess any substantial electrical resistance, said ring being fixed, by means of screws, on another ring 21 made of insulating material which is itself fixed on an externally screw-threaded ring 22 that serves, with the interposition of an insulating member 23, to clamp the potentiometer 15 in the bottom of the case 14 from which it is separated by an insulating disc 24. A screw 25 and its projection 26 prevents the parts 24, 15 and 23 from rotating when the ring 22 is screwed firmly home in the case 14 during assembly.

The plate 17 which carries the double brush 16 and into the recess 27 of which the crank-pin of the crank 11 penetrates, is secured to a bush 28 which is rotatable about a spindle 29 fixed to the case 14.

The ends of the wire 18 pass through the metal ring 22 in two insulating bushes 30 (Fig. 3) and are clamped in the slots of the terminals 31.

The circular contact ring 20 is connected to a conductor 32 which passes through an insulating bush 33 and is connected to the medial terminal 34 located between the terminals 31.

The three terminals 31 and 34 enable the wires extending to the receiver, which is placed at a distance, to be connected on the outside, the connections between the transmitter and the receiver being shown in the general electrical diagram of Fig. 14. The aforesaid terminals are prevented from rotating owing to the fact that they are provided with square portions 35 arranged in the corresponding square holes of an insulating plate 36. The external part of the terminals in question and the connections extending thereto are protected by a case 37 fixed to the box 14 by means of screws 38 and 25.

As shown in Figs. 1 to 4 in particular, the members which are associated with the case 14 form a separate electric apparatus which can be readily detached from (or connected to) the mechanical control float device associated with the base 1.

The electric apparatus and the mechanical device when connected to each other form a perfectly liquid-tight assembly owing to the plastic joint 39 placed between the base 1 and the case 14, to the semi-hard washers 40 placed under the heads of the screws 13 and to the insulating washers 41 clamped by the terminals 31 and 34.

Figure 16:
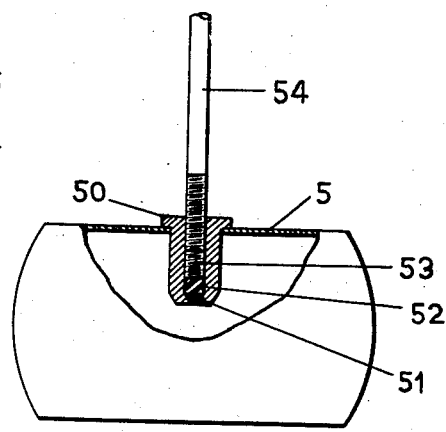
Fig. 16 is a section along the line XVI—XVI of Fig. 15 and shows a detail.

In order to enable the satisfactory operation of the apparatus to be checked before putting into use the tank to be gauged, each half of the double float 5 is provided with a special device which enables, on the one hand the tests for liquid-tightness to be effected, and on the other hand the float as a whole to be slid along the vertical guides 2 and the bent lever 3 which is placed between said guides. Said device, which is shown more particularly in Fig. 16, is composed of a kind of small tube 50 which is screw-threaded internally and soldered on the wall of the half-float 5, the end of the tube that communicates with the inside of the float being constricted relatively to the diameter of the screw-thread. After the tests for liquid-tightness of the float have been effected by means of the tube 50, a mass of lead 51 is introduced into said tube, a mass of plastic material 52 is superposed thereon and the whole is crushed by means of a screw 53. In the screw-thread portion that has remained free of the tube 50, there is screwed, for effecting the assembly, the end of a rod 54 which is sufficiently long to project, even when the float is at the bottom of its travel, outside a screw-threaded orifice provided in the support 1, which orifice is closed, when the apparatus is intended to be put into use, by means of a plug 55 carrying a column 56 which acts as a base for a braking washer clamped by the screw-threaded plug 57 of an inspection hole provided in the upper wall of said case. Another plug 58 is also screwed in the same end of the case 14 and enables the coupling between the pin of the crank 11 and the insulating plate 17 carrying the brush 16.

It is known that in gauging devices of the potentiometer type, the receiver is provided with two superposed coils which are arranged at right angles and apparently form a single block of attractive simplicity of construction, the angle of 90° formed between the two coils seemingly being in perfect harmony with the necessity for producing a resulting field acting on the magnetic armature.

Such systems however have various drawbacks. In fact, since one of the coils is outside the other, each of them must be fairly flat and therefore of limited power, so that their distances from the movable soft iron armature must not be very different. If the power is increased by a greater width of winding, this quickly produces a fairly bulky arrangement owing to the orthogonal device, and the fixing in a receiving case becomes substantially impracticable. If, on the other hand, the power is increased by a greater thickness of winding, the effects of the coils are no longer identical for the same current, unless the power of the outer coil is slightly increased in order to provide compensation, but in that case the difficulty is encountered that there is no longer identical action in some cases and this gives rise to errors of indication. The mass of the superposed windings furthermore facilitates abnormal heating which impairs the efficient operation and the accuracy of the indicator.

The indicator-receiver constructed according to the present invention does not have the above mentioned drawbacks, but retains the advantages of the systems which have just been referred to.

As shown in Figs. 7 to 13, and more particularly in Figs. 9 and 10 which show a general view of a double receiver indicator mounted in one and the same case, that is to say an apparatus that enables two separate tanks to be gauged, each receiver is provided with two coils 60 and 61 which are arranged in the extension of each other and exert their opposing action on two blades 62 and 63 of the soft iron armature 64, the coils in question being fixed to each other so as to form a rectangular parallelopiped assembly that enables them to be firmly fixed to the case 65 by means of six screws 66 and 66'. As shown best in Fig. 9, each set of two screws 66 and a screw 66' is threaded into a block member 166 rigidly attached to the frame carrying the coils. Each screw 66' which is made of soft iron and is of predetermined length, acts, in addition to fixing the coils, as an auxiliary pole which exerts an additional attraction on the blades 62 and 63, in the extreme (maximum and minimum) position of said blades, which attraction enables the amplitude of the movement of the pointer 68 to be corrected, more sensitivity to be given the apparatus at the end of the travel (case of an empty tank for example) and finally all the apparatus of the same series to be adjusted to a standard dial made beforehand, this being effected according to the results obtained with the first apparatus of the series (three on each side).

This arrangement enables coils to be obtained which are powerful, identical and the heating of which is very slight.

This organization and arrangement of the coils furthermore enables, in case one of the coils is defective, such coil to be replaced without touching the other.

Owing to the fact that the system of blades 62 and 63 have to be perfectly balanced in particular in the case in which the device is used on vehicles which are subjected to vibrations such as automobiles, motor launches, aeroplanes, rail coaches, etc., the blades in question form between them an angle of 120° and the balance referred to above is accurately obtained with a third blade 67 which is made of non-magnetic metal and is of the same shape as the other blades, but more or less thick according to the respective densities of the metals, and taking into account the weight of the pointer 68 which, although ultra-light, must obviously be compensated for.

It will immediately be seen that by means of the novel device, a very powerful, accurately balanced electrically and mechanically, and very rugged arrangement is obtained in a very simple manner. Of course, the shape of the magnetic blades and that of the compensating blade may vary according to the actions desired.

The power of the torque which acts on the blades is of fairly great importance owing to the presence of the pointer 68 whereof the mass, although very small, can only be theoretically perfectly balanced by means of an opposite mass relatively to the pivotal axis, which mass is arranged fairly far to the rear, which would require a bulky case. Now, the effect of the mass of the pointer 68 will be more reduced as the resultant torque which acts on the blades 62 and 63 is greater.

The spindle of the movable system is adjustably mounted in a stirrup 69 (see Figs. 10 and 12) serving as a support for each of the two coils, the framework of which is formed by a flat tube 70 soldered to a flange 71 that comes into contact with the stirrup 69 on which it is fixed.

As stated above, the receiver which is shown by way of example in Figs. 7 to 11 is a double receiver indicator. In the case of large aeroplanes for example, in which the fuel tanks are oft arranged in pairs, it is sufficient to have on 10 ble indicator, the case of which carries two graduated scales and a single row of figures (Fig. 7).

Figure 11:
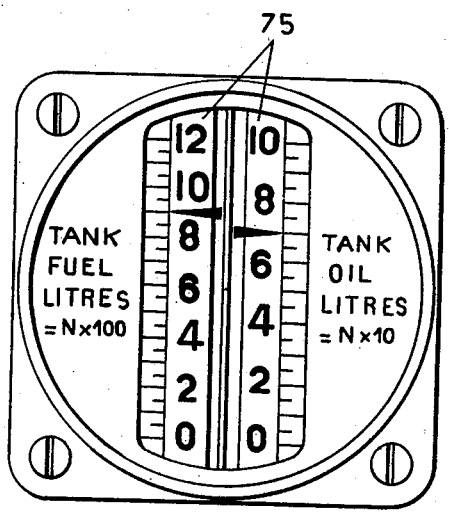
Fig. 11 shows a modification of Fig. 7.
Figure 12:
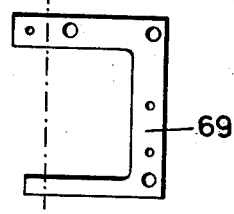
Figs. 12 and 13 show plan views of certain details of the receiver.
Figure 13:
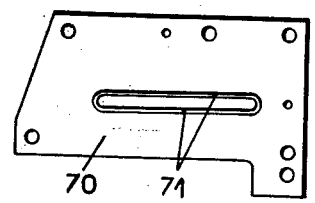
Figure 15:
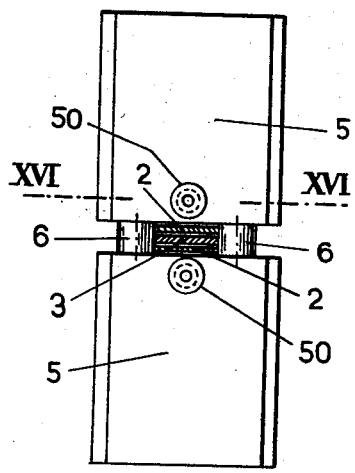
Fig. 15 is a plan view of the float.

In the case of a single fuel tank and of a single oil reservoir, it is possible, as shown in Fig. 11, to graduate one of the scales for the fuel and the other for the oil.

The operation of the device which has just been described is substantially the same as that of the known potentiometer gauges. By the effect of the slider 16, the resistance 18 of the potentiometer 15 is divided in a ratio that depends on the position of the slider 16, that is to say on the position of the float 5, consequently on the quantity of liquid contained in the tank R to be gauged. The intensity of the current flowing through the coils 60 and 61 is in the same ratio, and the two fields produced by the two aforesaid coils are proportional to the intensities of the current flowing through said coils. In the position shown in Fig. 9, the attraction exerted by the coil 61 is greater than that exerted by the coil 60, but as the attraction effects decrease as the blades 62 and 63 move nearer to the geometrical centres of the coils, it follows that for each position of the slider 16 of the potentiometer there exists only one position of equilibrium of the blades of the receiver so that the index of the pointer 68 occupies quite a definite position on the graduated scale 75.

It is obvious that the embodiment of the remote reading electric indicator gauge described above and illustrated in the accompanying drawings is only given in an indicative and non-limitative manner and that the device in question could be subjected to any modifications of detail without departing from the spirit of the invention.

What I claim is:

1. In an electrical indicator, a pair of rectangular coils rigidly mounted and having magnetic axes which are in alignment with one pole of one co-extensive with one pole of the other, a pivoted armature formed by two magnetic blades extending substantially 120° from each other and a non-magnetic balancing means, said blades and said balancing means being rigidly mounted together with the balancing means providing static balance for the armature, said armature being pivoted to move between two extreme positions as a result of a variation in the relative energization of the two coils with one coil being effective upon one of said blades and the other coil being effective upon the other of said blades.

2. An electrical indicator as described in claim 1 wherein an adjusting means is provided in the form of a soft iron threaded member with an extreme end extending axially with respect to one of said coils from the side of coil opposite the other coil said member exerting an effect upon the associated blade when the blade approaches alignment with the axis of the coil.

3. An electrical indicator as described in claim 1 wherein said armature carries a pointer which moves along a vertically extending graduated scale assembly carrying indices.

4. In an electrical indicator, a casing construction having a pair of opposite walls which are substantially parallel, a pair of rectangular coils rigidly mounted between said walls with their axes in alignment substantially perpendicular to said walls with one pole of one coil adjacent one of said walls and one pole of the other coil adjacent the other of said walls and with the other poles of the coil co-extensive, pivot means extending substantially parallel with said walls and having its axis intersecting the axis of said coils between the adjacent ends of the coils and across the short dimension of the rectangular cross-section of the coils, a magnetic armature in the form of a rigid member carried by said pivot means and formed by two arms one of which extends into one of said coils and the other of which extends into the other of said coils with each of the arms tending to be moved upon the magnetization of its coil toward a position of alignment with the axis of the coil, and an indicator connected to be moved with said armature, said armature including means statically balancing it whereby its position depends upon the relative energization of the two coils.

5. An assembly including two electrical indicators as described in claim 4 within a single casing and including two pairs of rectangular coils and the associated parts positioned in opposed relation with the axes of the two pivot means in substantial alignment.

6. An electrical indicator as described in claim 4 wherein each coil has a hole therethrough extending perpendicular to the adjacent wall, and an open-ended shell forming a lining for the walls of said hole with the shell extending from the adjacent wall to the end of the coil adjacent said pivot means, and wherein the end of each coil adjacent the pivot means is covered by a supporting plate having an opening coincident with the open end of said shell with the support plates for the two coils cooperating in supporting said pivot means and in turn being supported through said shells from the walls of the casing.

LUCIEN ALFRED MAURICE CORSET.